US009692300B2

United States Patent
Jefferies

(10) Patent No.: US 9,692,300 B2
(45) Date of Patent: Jun. 27, 2017

(54) SUPPLY REGULATION CIRCUIT WITH ENERGY EFFICIENT DIGITAL CONTROL

(71) Applicant: SCHNEIDER ELECTRIC USA, INC., Palatine, IL (US)

(72) Inventor: Kevin M. Jefferies, Raleigh, NC (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 14/773,825

(22) PCT Filed: Mar. 13, 2013

(86) PCT No.: PCT/US2013/030947
§ 371 (c)(1),
(2) Date: Sep. 9, 2015

(87) PCT Pub. No.: WO2014/142842
PCT Pub. Date: Sep. 18, 2014

(65) Prior Publication Data
US 2016/0028310 A1    Jan. 28, 2016

(51) Int. Cl.
*H02M 3/158*    (2006.01)
*H02M 3/156*    (2006.01)

(52) U.S. Cl.
CPC ......... *H02M 3/158* (2013.01); *H02M 3/1563* (2013.01)

(58) Field of Classification Search
CPC .... H02M 3/156; H02M 3/1563; H02M 3/157; H02M 3/158; G05F 3/08; G05F 3/16
See application file for complete search history.

(56) References Cited

U.S. PATENT DOCUMENTS

| 3,605,007 | A | * | 9/1971 | Jehle | .......................... | G05F 3/18 |
| | | | | | | 323/226 |
| 4,570,114 | A | * | 2/1986 | Heim | ....................... | G05F 3/227 |
| | | | | | | 323/313 |
| 4,581,540 | A | | 4/1986 | Guajardo | | |
| 4,751,463 | A | * | 6/1988 | Higgs | ...................... | G05F 3/265 |
| | | | | | | 323/281 |
| 5,041,747 | A | | 8/1991 | Chengson et al. | | |

(Continued)

OTHER PUBLICATIONS

International Search Report and Written Opinion mailed Jun. 10, 2013 in International Application No. PCT/US13/30947.

*Primary Examiner* — Matthew Nguyen
(74) *Attorney, Agent, or Firm* — Locke Lord LLP

(57) ABSTRACT

A regulated voltage system with digital control to maintain a regulated voltage supply and protection against overcurrents is disclosed. A regulated supply voltage circuit including a voltage output and a charging capacitor is coupled to a direct current power source. The regulated supply voltage output supplies power to an electrical load. A shunt transistor is coupled between the direct current power source and the regulated supply voltage circuit and ground. A shunt control circuit operates the shunt transistor between an open and closed state. The shunt control circuit includes a cross-coupled bias circuit coupled to a controller. The controller operates the shunt transistor according to a state machine having a first state to close the shunt transistor when the regulated supply voltage exceeds a maximum hysteresis voltage and a second state to open the shunt transistor when the regulated supply voltage is less than a minimum hysteresis voltage.

17 Claims, 2 Drawing Sheets

(56) References Cited

U.S. PATENT DOCUMENTS

| | | |
|---|---|---|
| 5,521,488 A | 5/1996 | Stockstad et al. |
| 5,554,924 A | 9/1996 | McMahon et al. |
| 6,188,206 B1 | 2/2001 | Nguyen et al. |
| 6,541,945 B1 * | 4/2003 | Smith .................... H03F 1/526 |
| | | 323/269 |
| 7,573,252 B1 * | 8/2009 | Griesert ................. G05F 3/262 |
| | | 323/315 |
| 2006/0208716 A1 | 9/2006 | Chapuis |
| 2007/0115041 A1 | 5/2007 | Tachibana et al. |

* cited by examiner

SUPPLY REGULATION CIRCUIT WITH ENERGY EFFICIENT DIGITAL CONTROL

TECHNICAL FIELD

The present disclosure relates generally to voltage regulators and more specifically to digitally controlled power supply regulator.

BACKGROUND

Voltage regulators often use a shunting element to maintain a stable voltage from an incoming power source providing a higher voltage than that required by an electrical load. Such voltage regulators use a shunting element such as a transistor to divert extra current from the incoming power source when voltage exceeds the desired regulated level. Shunting regulators provide simple, effective low cost voltage regulation that is adequate for many electronic devices, and are therefore ubiquitous in low power electronics designs. For example, shunting voltage regulators are used with electronic protective devices such as circuit breakers and motor overload relays.

Shunting voltage regulation may include linear or switching type shunts. Linear shunts operate by dissipating a variable amount of power to maintain a stable regulated voltage. The power dissipated by the shunting element is therefore the product of the shunted current and the regulated voltage. The shunted current is set to the difference between the incoming supply current and the current consumed by the load on the regulated voltage. The shunt current is linearly related to the load current to linearly regulate the output voltage.

In contrast, switching shunt regulators operate by switching the shunting element between on and off states. With the shunting element off, the shunt current is zero. When the shunting element is on, the shunt current is the total supply current provided by the incoming power source. The instantaneous power dissipation is decreased because the voltage across the shunting element is reduced from the load voltage to a minimum based on the conduction resistance of the shunting element. This reduces the power dissipated in the shunting element overall, allowing a switching shunt regulator to achieve a lower power dissipation and higher efficiency than a linear shunt regulator.

FIG. 1 shows a typical voltage regulation system 10 having a switching shunt circuit. The voltage regulation system 10 includes an incoming direct current power source 12 which is coupled to a switching shunt circuit 14. The shunt circuit 14 regulates the power output from the direct current power source 12 to a voltage regulator circuit 16 which is coupled to a voltage load 18. The switching shunt supply regulation circuit 10 has a shunt transistor 20 that is coupled to a charging capacitor 22 in the voltage regulation circuit 16. The incoming power from the direct current power source 12 is accumulated in the charging capacitor 22 which creates a low pass filter for the supply voltage 12. When the shunt transistor 20 is on, the power delivered to the voltage load 18 is provided by discharging the capacitor 22, which is charged when the shunt transistor 20 is off.

Simple control of the shunt transistor 20 may be achieved with an analog control circuit that is coupled to a gate 24 of the shunt transistor 20 to switch the shunt transistor 20 on or off. Comparators, operational amplifiers or similar analog elements may establish a nominal supply voltage. With a switching shunt regulator, a hysteresis band around the nominal supply voltage determines transition points for turning the shunt transistor 20 on and off. When the supply voltage from the regulator circuit 16 reaches or falls below the hysteresis minimum, the control circuit turns the shunt transistor 20 off allowing the direct current power source 12 to be connected to the charging capacitor 22 thus accumulating energy in and increasing the charge of the charging capacitor 22. When the supply voltage from the regulator circuit 16 reaches or exceeds the hysteresis maximum the shunt transistor 20 is turned on, the direct current power source 12 is disconnected from the charging capacitor 22, and the load 18 is powered by the discharging of charging capacitor 22.

With the continued trend toward integration of digital controls into electronic devices, digital logic has replaced analog control components. Digital electronics devices such as a programmable digital controller may achieve the functions of the operational amplifiers and comparators used to control the shunt operation in an analog design. For example, a microcontroller can monitor the regulated supply voltage via digital sampling and make regulator shunt control decisions based on the sampling. A simple state machine routine executed by a digital controller may be used to control the shunt transistor 20. As is known, a state machine is a low processing programmable routine that makes decisions between states. In this case, the state machine has a first state where the shunt transistor 20 is on and a second state where the shunt transistor 20 is off. The decision to transition between states is made depending on the sampled regulated supply voltage.

Self-powered devices such as circuit breakers and overload relays using a digital controller have some intrinsic design constraints. Digital controllers require power to sample the supply voltage and execute routines such as the state machine to control the shunting element. Further, power is required to maintain the shunt transistor 20 in either an on or off state. However, reducing the power consumed by the controller can help increase the operational range of the controller or help improve measurement accuracy by reducing the power burden on the regulated voltage circuit that provides operational power to the controller. Maximizing the operation of the digital controller in low power consumption modes helps to reduce power consumption and achieve the benefits associated with reduced power consumption.

For digital control of the switching shunt circuit, low power operation may be achieved simply by reducing the frequency of updating the input voltage measurements to the state machine. However, the tradeoff associated with reducing the update frequency is that with less frequent sampling of the supply voltage, the response time of controlling the shunting element to prevent a voltage approaching or crossing beyond the hysteresis limits is accordingly increased.

The self-powered protective device may also be required to withstand or operate during conditions beyond the normal operational range of the electrical load. For example, during a short circuit event, the current measured by the protective device may exceed the normal current of the protected load by several orders of magnitude. This can correspond to a charging slew rate of the power supply voltage also orders of magnitude faster than during normal operation of the device. This introduces an additional requirement of the regulated power supply to respond to a significantly faster rise in the power supply voltage to protect the device electronics from an over voltage condition. Overvoltage protection in the form of a zener diode may be added to the typical shunting power supply circuit but this does not address the issue of a rapid reaction to an overcurrent condition. When the current measured by the protective device may exceed the normal current by several orders of magnitude the zener diode is required to dissipate power several orders of magnitude above normal operation. This creates a constraint to withstand this power dissipation and to use zener diode components with the necessary power dissipation rating which may not exist. Current digital controllers must therefore sample the regulated voltage frequently in order to protect against massive overcurrents. Such capabilities require greater power consumption from the controller.

Thus, a need exists for a digitally controlled power regulation circuit that minimizes energy consumed by the controller while allowing for rapid switching of the shunt element. There is a further need for a power regulation circuit that allows for rapid transitions between the on and off state of the shunting element. There is also a need for a power regulation circuit that detects overcurrents and turns on the shunt element to protect loads independent of the sampling speed of the controller thereby minimizing power consumption.

SUMMARY

One disclosed example is a digitally controlled regulated switching shunt circuit for self-powered electronic overcurrent protective devices. The digitally regulated shunt circuit has a direct current power source that powers a regulated voltage source with a charging capacitor that outputs a regulated voltage to an electrical load. A controller controls a shunt transistor to maintain the voltage from the regulated voltage between a minimum hysteresis voltage and a maximum hysteresis voltage using a two state machine. When the maximum hysteresis voltage is reached or exceeded, the state machine changes states and the controller turns the shunt transistor on thereby grounding the direct current power source. The stored energy in the charging capacitor powers the electrical load when the shunt transistor is turned on. When the regulated voltage falls to or below the minimum hysteresis voltage, the state machine changes and the controller turns off the shunt transistor thereby connecting the direct current power source to the regulated voltage source. The charging capacitor then begins to store energy.

The controller is coupled through a two transistor cross-coupled bias circuit that minimizes the transition time when turning the shunt transistor on. The two transistor cross-coupled bias circuit acts as a latch to hold the shunt transistor on without an input signal from the controller thereby minimizing controller power consumption. Further, the controller conserves energy by only periodically sampling the regulated voltage. An overcurrent circuit in the form of a zener diode coupled to the cross-coupled bias circuit provides rapid detection of an overcurrent bypassing the controller. This allows the power of the controller to be conserved as detection of an overcurrent allows the controller to be alerted through a control port.

Thus, the disclosed new regulation circuit and supply regulation technique addresses the conflicting goals of energy efficient operation of a controller in a self-powered protective device and providing protection against overcurrent conditions subsequent to a short circuit event. The regulation circuit allows the supply regulation state machine update frequency to be minimized to reduce current consumption of the device, while simultaneously meeting the need for a response during extreme events such as a short circuit that is sufficiently rapid to protect the device electronics from exposure to an over voltage condition.

Additional aspects will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings.

Figure 1:
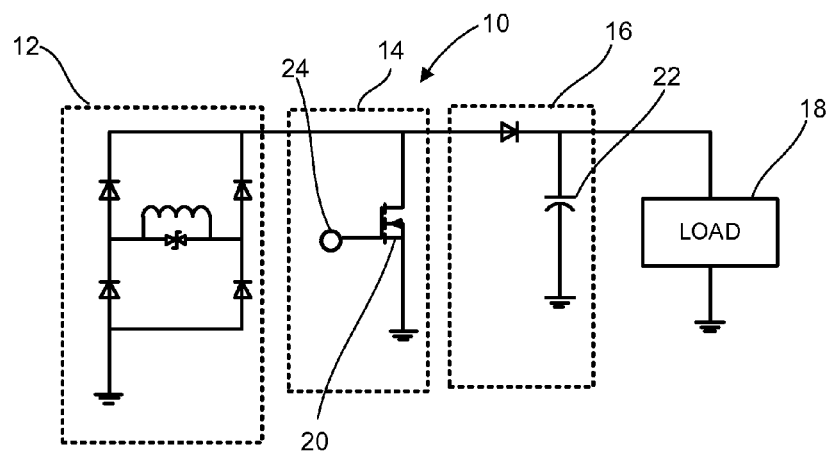
FIG. 1 is a circuit diagram of a known power regulator circuit using a shunt transistor.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

One example is a regulated voltage system having a direct current power source and a regulated voltage supply circuit. The regulated voltage supply circuit includes a regulated voltage supply output and a charging capacitor coupled to the direct current power source. The regulated voltage supply output supplies power to an electrical load. A shunt transistor has a gate, a drain coupled to the direct current power source and the regulated voltage supply circuit, and a source coupled to ground. A shunt control circuit operates the shunt transistor between an open and closed state. The shunt control circuit includes a cross-coupled bias circuit coupled to the gate of the shunt transistor. A controller has an output port coupled to the cross-coupled bias circuit and an input port coupled the regulated voltage supply output. The controller controls the shunt transistor according to a state machine having a first state to close the shunt transistor when the regulated supply voltage reaches or exceeds a maximum hysteresis value. The state machine has a second state to open the shunt transistor when the regulated supply voltage is equal to or less than a minimum hysteresis value. The controller periodically samples the regulated voltage supply output and sends a control signal to the cross-coupled bias circuit.

Another example is a method of digital control to regulate voltage from a power source to a load. A direct current power output is provided. A shunt transistor coupled between the direct current power output and ground is switched via a shunt control circuit between an open and closed state. The shunt control circuit includes a cross-coupled bias circuit coupled to the gate of the shunt transistor. A regulated voltage supply output is provided to an electrical load via the direct current power output. A charging capacitor is charged when the shunt transistor is in the open state. The regulated voltage supply output to the electrical load is provided via the charging capacitor when the shunt transistor is in the closed state. The regulated voltage supply output is sampled by a controller. The switching of the shunt transistor is controlled by a state machine running on the controller. The controller has a first state to open the shunt transistor when the regulated supply voltage reaches or exceeds a maximum hysteresis value. The state machine has a second state to close the shunt transistor when the regulated supply voltage is less than or equal to a minimum hysteresis value.

Another example is a regulated voltage supply circuit having a regulated voltage supply circuit including a regulated voltage supply output and a charging capacitor coupled to a direct current power source. The regulated voltage supply output supplies power to an electrical load. A shunt transistor has a gate, a drain coupled to the direct current power source and the regulated voltage supply circuit, and a source coupled to ground. A shunt control circuit operates the shunt transistor between an open and closed state. The shunt control circuit including a first bias transistor having a gate coupled to a first bias resistor, a source coupled to ground and a drain coupled to the gate of a second bias transistor. The second bias transistor has a drain coupled to a second bias resistor and a source coupled to the regulated supply voltage output. The second bias resistor is coupled to the gate of the first bias transistor, the first bias resistor and the controller. A third bias resistor is coupled between the gate of the second bias transistor and the regulated supply voltage output. A controller has an output port coupled to the gate of the first bias transistor and an input port coupled the regulated voltage supply output. The controller controls the shunt transistor according to a state machine having a first state to close the shunt transistor when the regulated supply voltage equals or exceeds a maximum hysteresis value. The state machine has a second state to open the shunt transistor when the regulated supply voltage is equal to or less than a minimum hysteresis value. The controller periodically samples the regulated voltage supply output and sends a control signal via the output port to control the shunt transistor.

Figure 2:
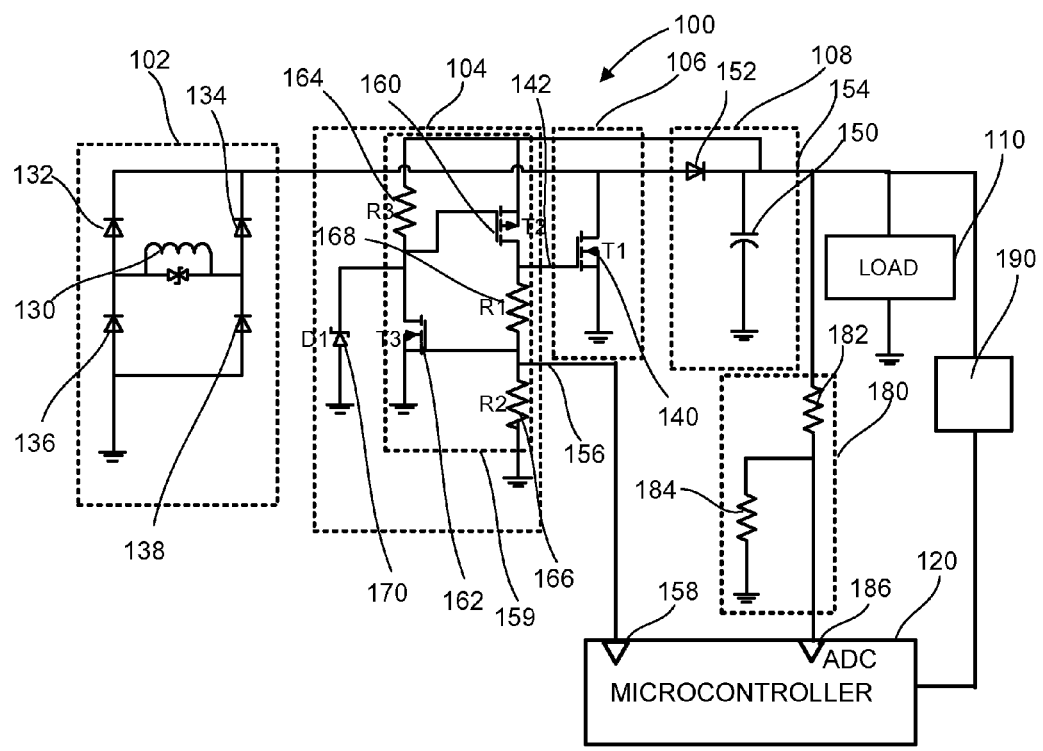
FIG. 2 is a circuit diagram of an example power regulation system using a controller running a state machine.

FIG. 2 shows a regulated voltage system 100 that includes a direct current power source 102, a shunt control circuit 104, a shunt circuit 106, a regulated voltage supply circuit 108 and an electrical load 110. A controller such as the microcontroller 120 is coupled to the shunt control circuit 104 to control the shunt control circuit 104 as explained above. The microcontroller 120 provides digital control over the shunt circuit 106. The regulated voltage system 100 provides regulated power to the electrical load 110 and uses the shunt circuit 106 to insure that the voltage supplied stays within the maximum and minimum hysteresis of the desired voltage supplied to the electrical load 110. The electrical load 110 is any electrical device or devices that requires regulated power and may include for example circuit breakers, relays, motor circuit protectors, etc.

The direct current power source 102 is coupled to an AC source via a transformer 130 and has a series of four rectifier diodes 132, 134, 136 and 138 coupled to the transformer 130. The four rectifier diodes 132, 134, 136 and 138 are wired in a bridge configuration to convert alternating current voltage from the transformer 130 to a direct current power source output which is coupled to the regulated voltage supply circuit 108.

The shunt circuit 106 includes a shunt transistor 140 which is coupled between ground and the direct current power output of the direct current power source 102 and the regulated voltage supply circuit 108. In this example, the shunt transistor 140 is an n-type MOSFET but other switching devices may be used as a shunting element. In this example, the drain of the shunt transistor 140 is coupled to the direct current power output of the direct current power source 102. The source of the shunt transistor 140 is coupled to ground. The gate of the shunt transistor 140 is coupled to a control input 142 which is coupled to the shunt control circuit 104.

The regulated voltage supply circuit 108 includes an electrolytic charging capacitor 150 tied between the cathode of the diode 152 and ground. The anode of the diode 152 is tied to the direct current power source 102. The regulated voltage supply circuit 108 includes a regulated voltage supply output 154 from the cathode of the diode 152 that is coupled to the electrical load 110. The diode 152 serves to prevent the charging capacitor 150 from discharging into the shunt transistor 140 when the charging capacitor 150 powers the electrical load 110.

The shunt transistor 140, when closed by a high signal to the gate via the control input 142, grounds the output of the direct current power source 102. In this state, the regulated voltage supply circuit 108 supplies power to the electrical load 110 by discharging energy stored in the charging capacitor 150. When opened by a low signal to the gate via the control input 142, the shunt transistor 140 allows the current to flow directly from the direct current power source 102 to the electrical load 110. The direct current power source 102 in this state charges the charging capacitor 150 of the regulated voltage supply circuit 108.

The shunt control circuit 104 includes a control input 156 coupled to an output port 158 of the microcontroller 120. The shunt control circuit 104 serves to amplify the output signal from the output port 158 of the microcontroller 120 to sufficiently drive the shunt transistor 140. A linear voltage regulator as part of the voltage load 110 provides power to the microcontroller 120. Energy is accumulated in a suitable storage device, for example the electrolytic charging capacitor 150 to power the electrical load 110 when the shunt transistor 140 is turned on. One function of the device electronics such as the microcontroller 120 powered by the regulated voltage supply 108 is control of the switching shunt transistor 140 which maintains the regulated supply voltage output of the regulated supply voltage circuit 108 within the desired hysteresis range.

The shunt control circuit 104 may include a single bias transistor having a source tied to ground and a drain coupled to the gate of the shunt transistor 140 in conjunction with a pull up resistor. The bias transistor therefore functions as an amplifier to allow the microcontroller 120 to control the state of the shunt transistor 140. Such a configuration translates the voltage signal of a microcontroller output used to control the shunt transistor 140 to a higher voltage required to fully bias the shunt transistor 140. This is commonly required with the operating voltages of microcontrollers being relatively low to reduce power consumption in contrast to the higher gate biasing voltages of the relatively higher power shunt transistor 140.

One drawback to a simple voltage translation scheme with a single amplifier such as a biasing transistor and pull up resistor to amplify the signal from the microcontroller 120 to control the shunt transistor is that the shunt transition to turn off is significantly faster than the transition to turn on. This increases power dissipation in the shunt circuit 106 during the transition period, notably during transitions such as turning the shunt transistor 140 on to protect the circuit from an over voltage. Reducing the resistance of the pull up resistor to decrease the transition time has the negative effect of increasing the current through the biasing transistor whenever the shunt transistor 140 is turned off, increasing the discharge slew rate of the charging capacitor 150 and the current consumption of the regulated voltage system 100. Further, since a signal must be present from the microcontroller in order to keep the shunt transistor 140 open, the microcontroller 120 consumes power in the operation of the shunt transistor 140.

To minimize power consumption of the microcontroller 120 and to reduce the transition time for switching the shunt transistor 140, the shunt control circuit 104 in this example includes a cross-coupled biasing circuit 159 including biasing transistors 160 and 162 which are cross-coupled with each other. In this example, the biasing transistor 160 is a p-type MOSFET and the biasing transistor 162 is an n-type MOSFET. The biasing transistors 160 and 162 function to turn each other off or on to quickly transition the state of the shunt transistor 140.

The source of the biasing transistor 160 is tied to the voltage output 154 of the regulated voltage supply circuit 108. The drain of the biasing transistor 160 is coupled to the gate of the shunt transistor 140. The gate of the biasing transistor 160 is coupled to one end of a pull up resistor 164 which is coupled between the voltage output 154 of the regulated voltage supply circuit 108 and the drain of the biasing transistor 162. The source of the biasing transistor 162 is coupled to ground. The control input 156 is coupled to a resistor 166 which is coupled between the gate of the biasing transistor 162 and ground. The control input 156 is coupled to a second resistor 168 which is coupled between the gate of the biasing transistor 162 and the gate of the shunt transistor 140 and the drain of the biasing transistor 160. Thus, the input signal from the microcontroller 120 is coupled to the node of the control input 156 that is tied between the two bias resistors 166 and 168 that are coupled in a voltage divider arrangement. The bias resistors 166 and 168 allow voltages to be applied to the gates of the biasing transistor 162 and the shunt transistor 140.

The cross-coupled biasing circuit 159 including the two bias transistors 160 and 162 achieves the voltage translation function from the control signal of the microcontroller 120. The cross-coupled biasing circuit 159 also reduces the static current consumption and dramatically decreases the transition times of the shunt transistor 140 based on the cross coupled arrangement of the two bias transistors 160 and 162. Finally, the cross-coupled biasing circuit 159 acts as a latch holding signals received from the microcontroller 120 to maintain the state of the shunt transistor 140.

The microcontroller 120 raises the shunt control signal from the output port 158 to turn on the shunt transistor 140. The output control signal is fed into the control input 156 and raises the voltage on the gate of the biasing transistor 162 to the level of the output voltage on the output port 158, beginning the transition of the shunt transistor 140 to the on state. The biasing transistor 162 begins to conduct as its gate voltage is raised by the control signal from the microcontroller 120, resulting in the cross-coupled biasing transistor 160 turning on since the voltage from the regulated voltage supply circuit 108 is pulled down by the resistor 164. This turns on the cross-coupled biasing transistor 160 further, raising the gate voltage of the shunt transistor 140 from the voltage regulator voltage from the regulated voltage supply circuit 108 being connected to the resistor 166. The voltage regulator voltage also results in the gate voltage of the biasing transistor 162 being raised from the voltage across the resistor 168. The cross-coupled arrangement of the transistors 160 and 162 results in rapid increases of gate voltages to the transistors 160 and 162 to therefore rapidly bias the gate of the shunt transistor 140 fully on.

The microcontroller 120 lowers the shunt control signal from the output port 158 to the control input 156 to turn off the shunt circuit 106. A low signal from the microcontroller 120 reduces the voltage on the gate of the shunt transistor 140 by removing the resistor divider formed by the two biasing resistors 166 and 168. This lowers the voltage to the gate of the biasing transistor 162 which turns off the biasing transistor 162. Since the biasing transistor 162 is turned off, the voltage drop across the resistor 164 is lowered which pulls up the voltage to the gate of the biasing transistor 160. The biasing transistor 160 is turned off and therefore lowers the voltage on the gate of the shunt transistor 140 and biases the shunt transistor 140 fully off.

Another benefit of the cross-coupled arrangement of the biasing transistors 160 and 162 is a bi-stable state for the shunt control circuit 104. When the microcontroller 120 raises or lowers the shunt control signal voltage, the cross-coupled arrangement of the biasing transistors 160 and 162 maintains the state of the shunt transistor 140. Thus, the transistors 160 and 162 acts as a latch to continue to keep a high signal biasing the gate of the shunt transistor 140 on allowing the microcontroller 120 to provide a high impedance to the output port 158. This allows the microcontroller 120 to conserve energy by only maintaining a control signal having a limited duration through the output port 158 to activate the cross-coupled bias circuit 159.

The microcontroller 120 can therefore cease asserting the control signal to the control input 156 at a high voltage level and provide a high impedance output to the output port 158 which effectively converts the output port 158 into an input. This procedure allows increased low power operation and reduced device current consumption for the microcontroller 120 since a high signal does not have to be maintained on the output port 148.

The regulated voltage system 100 also provides simple, asynchronous overvoltage detection independent of the microcontroller 120. A zener diode 170 is coupled in series with the resistor 164 between the regulated voltage supply output 154 and ground. When an overcurrent condition occurs, the regulated supply voltage from the regulated voltage supply circuit 108 creates an excessive voltage over the resistor 164 which exceeds the breakdown voltage of the zener diode 170. In the regulated voltage system 100, the zener diode 170 does not clamp the supply voltage by acting as a linear shunt element and dissipating incoming supply power to control the voltage. Instead, the zener diode 170 acts as a separate control for the shunt circuit 106. When the voltage on the regulated voltage output 154 rises sufficiently for the zener diode 170 to enter conduction, the biasing transistor 160 begins to turn on from the voltage increase across the resistor 164. This in turn increases the voltage across the gate of the biasing transistor 162 which turns on the transistor 162. With the cross-coupled arrangement of the biasing transistors 160 and 162 rapidly increasing the respective gate voltages, the shunt control circuit 104 quickly changes state and the shunt transistor 140 is turned on.

The overvoltage detection provided by the zener diode 170 of the regulated voltage circuit 100 has few parasitic elements to delay the transition between the off and on states of the shunt transistor 140 allowing fast response to an overvoltage condition. The regulated voltage system 100 therefore protects the regulated voltage supply circuit 108 and the electrical load 110 from overvoltage conditions, responding quickly and without requiring intervention or action by the microcontroller 120.

The addition of the zener diode 170 allows the microcontroller 120 to enter a sleep state after sending a control signal to operate the shunt transistor 140. The microcontroller 120 may maintain the port 158 at a high impedance therefore converting the port 158 into an input to enter the sleep state. An overvoltage detection performed by the zener diode 170 results in the raised voltage across the resistor 168 being present on the port 158. With port 158 configured as an input the raised voltage present on port 158 may be used to trigger an input interrupt to wake up the microcontroller 120. This feature may be used for applications such as a relay or a motor control device.

Figure 3:
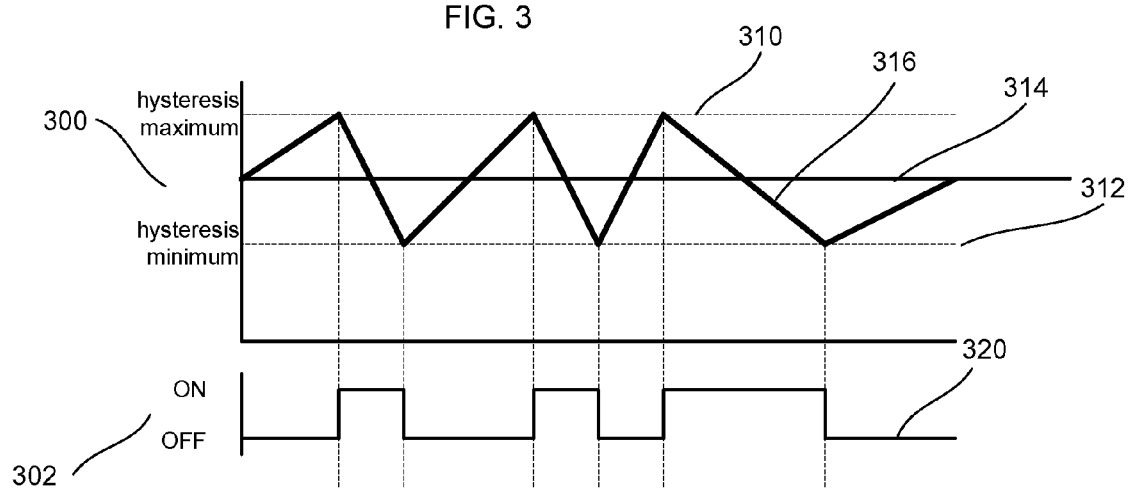
FIG. 3 is a timing diagram showing the signals used by the power regulation system in FIG. 2 to regulate voltage.

FIG. 3 is a voltage timing diagram showing the output of the regulated voltage system 100 in FIG. 2. A top graph 300 shows the voltage output from the regulated voltage circuit 108 in FIG. 2 and a bottom graph 302 is a diagram of the state of the control signal at the control input 142 to operate shunt circuit 106. The top graph 300 includes a hysteresis maximum value 310 and a hysteresis minimum value 312. As explained above, the regulated power supply has a desired nominal value represented by a line 314 which determines the hysteresis band defined by the maximum and minimum values 310 and 312. The regulated supply voltage output by the regulated voltage supply circuit 108 is sampled by the microcontroller 120 in FIG. 2 and supplied to the electrical load 110 is represented by a line 316.

The control signal output by the microcontroller 120 results in a latched signal to the control input 142 coupled to the gate of the shunt transistor 140 which is represented by a signal line 320 in FIG. 3. As explained above, the cross-coupled transistors 160 and 162 in FIG. 2 hold the input signal level from the microcontroller 120 allowing the microcontroller to reduce voltage output from the control input 156 coupled to the shunt control circuit 104.

As the regulated supply voltage output 316 reaches the hysteresis minimum value 312, the state machine in the microcontroller 120 turns the shunt transistor 140 off. This causes the direct current power source 102 to be directly connected to the regulated voltage supply circuit 108 thereby powering the electrical load 110 and charging the charging capacitor 150. When the regulated supply voltage output 316 reaches or exceeds the hysteresis maximum value 310 the microcontroller 120 turns the shunt transistor 140 on which causes the shunt transistor 140 to tie the direct current power source 102 to ground and disconnect from the regulated voltage supply circuit 108. The charging capacitor 150 of the regulated voltage supply circuit 108 is discharged and powers the electrical load 110 at a voltage under the hysteresis maximum value 310. As shown in FIG. 3, the regulated supply voltage output 316 from the charging capacitor 150 eventually drops to or below the hysteresis minimum value 312 which causes the microcontroller 120 to turn the shunt transistor 140 off to reconnect the direct current power source 102.

Returning to FIG. 2, the microcontroller 120 monitors the regulated voltage supply output 154 by a conversion circuit 180. The conversion circuit 180 includes two resistors 182 and 184 connected in series. The first resistor 182 is coupled to the regulated voltage supply output 154 and the second resistor 184 is coupled to ground. An input 186 of the microcontroller 120 is coupled between the resistors 182 and 184 which serve as a voltage divider. The input 186 of the microcontroller 120 is coupled to an internal analog to digital converter (ADC) which outputs a digital signal which is sampled on a periodic basis by the microcontroller 120. As shown in FIG. 2, the regulated voltage supply output 154 is also used to power the microcontroller 120. In this example the microcontroller 120 is powered by a power supply 190 coupled to the regulated voltage supply output 154. The power supply 190 may be a linear regulator circuit or another suitable power circuit.

The sample period for reading the converted digital value from the input 186 is selected to minimize energy consumption of the microcontroller 120 while maintaining the regulated power supply voltage within the hysteresis band (between voltage values 310 and 312) shown in FIG. 3. The microcontroller 120 executes programming instructions to make regulator shunt control decisions for the shunt transistor 140 based on the sampled input signal from the input 186 which represents the regulated voltage supply level on the supply output 154. As will be explained below, the microcontroller 120 in this example uses a state machine operating from the regulated supply voltage value sampled from the conversion circuit 180.

Figure 4:
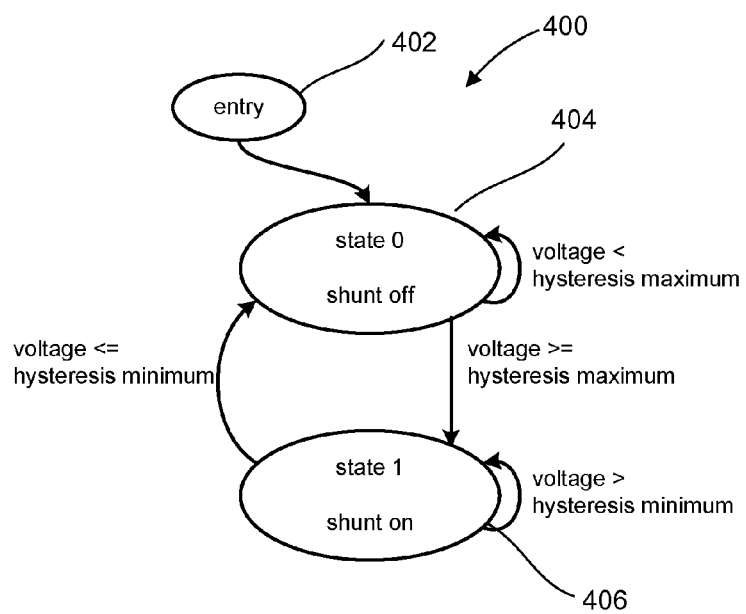
FIG. 4 is a state diagram of the state machine executed by the controller in the power regulation system in FIG. 2.

The microcontroller 120 is an example controller that may feature processing cores and peripherals which can be operated at various states of power consumption. Maximizing the operation in low power consumption states helps to reduce power consumption of the controller and achieve the benefits associated with reduced power consumption. The microcontroller 120 sets the shunt state according to a supply regulation state machine having a state diagram 400 shown in FIG. 4. The state machine 400 determines if the shunt transistor 140 in FIG. 2 should be switched on or off based on the regulated voltage supply output 154 relative to the desired voltage hysteresis range (between voltage values 310 and 312) shown in FIG. 3.

The state machine run by the microcontroller 120 begins with an entry state 402. A first state 404 is the state where the shunt transistor 140 is turned off. The state machine remains in the first state 404 if the regulated supply voltage output 316 is below the hysteresis maximum value 310 in FIG. 3. If the regulated supply voltage output 316 exceeds or is at the hysteresis maximum value 310, the state machine transitions to a second state 406 where the shunt transistor 140 is turned on. If a transition between states is indicated, the microcontroller 120 outputs a high control output signal resulting in a high output 320 on the control input 142 from the shunt control circuit 104. The state machine remains in the second state 406 if the regulated supply voltage output 316 exceeds the hysteresis minimum value 312 in FIG. 3. If the regulated supply voltage output 316 equals or is lower than the hysteresis minimum value 312 in FIG. 3, the state machine transitions back to the first state 404. This results in a low control output signal 320 in FIG. 3 to the control input 142 to be triggered by the microcontroller 120 in FIG. 2 from the shunt control circuit 104 to turn the shunt transistor 140 off.

It is to be understood that the microcontroller 120 is an example controller. Any suitable controller may be used. Thus, the microcontroller 120 may be conveniently implemented using one or more general purpose computer systems, microprocessors, digital signal processors, microcontrollers, application specific integrated circuits (ASIC), programmable logic devices (PLD), field programmable logic devices (FPLD), field programmable gate arrays (FPGA), and the like, programmed according to the teachings as described and illustrated herein, as will be appreciated by those skilled in the computer, software, and networking arts.

While the present invention has been described with reference to one or more particular embodiments, those skilled in the art will recognize that many changes can be made thereto without departing from the spirit and scope of the present invention. Each of these embodiments and obvious variations thereof is contemplated as falling within the spirit and scope of the claimed invention, which is set forth in the following claims.

What is claimed is:

1. A regulated voltage system, comprising:
a direct current power source;
a regulated voltage supply circuit including a regulated voltage supply output and a charging capacitor coupled to the direct current power source, the regulated voltage supply output supplying power to an electrical load;
a shunt transistor having a gate, a drain coupled to the direct current power source and the regulated voltage supply circuit, and a source coupled to ground;
a shunt control circuit to operate the shunt transistor between an open and closed state, the shunt control circuit including a cross-coupled bias circuit coupled to the gate of the shunt transistor; and
a controller having an output port coupled to the cross-coupled bias circuit and an input port coupled the regulated voltage supply output, the controller controlling the shunt transistor according to a state machine having a first state to close the shunt transistor when the regulated supply voltage reaches or exceeds a maximum hysteresis value and a second state to open the shunt transistor when the regulated supply voltage is equal to or less than a minimum hysteresis value, the controller periodically sampling the regulated voltage supply output and sending a control signal to the cross-coupled bias circuit; and
wherein the cross-coupled bias circuit includes a first bias transistor having a gate coupled to the controller and a first bias resistor, a source coupled to ground and a drain coupled to the gate of a second bias transistor, the second bias transistor having a drain coupled to a second bias resistor and a source coupled to the regulated supply voltage output, wherein the second bias resistor is coupled to the gate of the first bias transistor, the first bias resistor and the controller, and wherein a third bias resistor is coupled between the gate of the second bias transistor and the regulated supply voltage output.

2. The system of claim 1, wherein the charging capacitor of the regulated supply voltage circuit is coupled to the gate of the shunt transistor.

3. The system of claim 1, wherein the controller is a microcontroller.

4. The system of claim 1, wherein the first bias transistor is an n-type MOSFET and the second bias transistor is a p-type MOSFET.

5. The system of claim 1, wherein the shunt control circuit includes a zener diode coupled between the regulated voltage supply output and ground, wherein the zener diode detects overcurrents from the direct current power source and activates the shunt control circuit to turn the shunt transistor on.

6. The system of claim 1, further comprising a resistor divider circuit coupled between the input port of the controller and the voltage regulator output, and wherein the controller includes an analog to digital converter coupled to the input port.

7. The system of claim 1, wherein the controller sends a discrete control signal through the output port to control the shunt transistor and sets the output port to a high impedance value after sending the discrete control signal.

8. The system of claim 1, wherein the controller periodically samples the input port at a predetermined interval selected based on minimizing power consumption of the controller and maintaining the regulated voltage supply output between the maximum and minimum hysteresis values.

9. A method of digital control to regulate voltage from a power source to a load, comprising:
providing a direct current power output;
switching a shunt transistor coupled between the direct current power output and ground via a shunt control circuit between an open and closed state, the shunt control circuit including a cross-coupled bias circuit coupled to the gate of the shunt transistor;
providing a regulated voltage supply output to an electrical load via the direct current power output and charging a charging capacitor when the shunt transistor is in the open state;
providing the regulated voltage supply output to the electrical load via the charging capacitor when the shunt transistor is in the closed state;
sampling the regulated voltage supply output by a controller; and
controlling the switching of the shunt transistor by a state machine running on the controller, the controller having a first state to open the shunt transistor when the regulated supply voltage reaches or exceeds a maximum hysteresis value and a second state to close the shunt transistor when the regulated supply voltage is equal to or less than a minimum hysteresis value; and
wherein the cross-coupled bias circuit includes a first bias transistor having a gate coupled to the controller and a first bias resistor, a source coupled to ground and a drain coupled to the gate of a second bias transistor, the second bias transistor having a drain coupled to a second bias resistor and a source coupled to the regulated supply voltage output, wherein the second bias resistor is coupled to the gate of the first bias transistor, the first bias resistor and the controller, and wherein a third bias resistor is coupled between the gate of the second bias transistor and the regulated supply voltage output.

10. The method of claim 9, wherein the controller is a microcontroller.

11. The method of claim 9, wherein the first bias transistor is an n-type MOSFET and the second bias transistor is a p-type MOSFET.

12. The method of claim 9, further comprising:
detecting overcurrents from the direct current power source by a zener diode coupled between the direct current power source and ground; and
turning the shunt transistor on via the zener diode.

13. The method of claim 9, wherein a resistor divider circuit is coupled between an input port of the controller and the voltage regulator output, and wherein the controller includes an analog to digital converter coupled to the input port.

14. The method of claim 9, wherein the controller sends a discrete control signal through an output port to control the shunt transistor and sets the output port to a high impedance value after sending the discrete control signal.

15. The method of claim 9, wherein the sampling occurs at a predetermined interval selected based on minimizing power consumption of the controller and maintaining the regulated voltage supply output between the maximum and minimum hysteresis values.

16. A regulated voltage supply circuit, comprising:
a regulated voltage supply circuit including a regulated voltage supply output and a charging capacitor coupled to a direct current power source, the regulated voltage supply output supplying power to an electrical load;

a shunt transistor having a gate, a drain coupled to the direct current power source and the regulated voltage supply circuit, and a source coupled to ground;

a shunt control circuit to operate the shunt transistor between an open and closed state, the shunt control circuit including a first bias transistor having a gate coupled to a first bias resistor, a source coupled to ground and a drain coupled to the gate of a second bias transistor, the second bias transistor having a drain coupled to a second bias resistor and a source coupled to the regulated supply voltage output, wherein the second bias resistor is coupled to the gate of the first bias transistor, the first bias resistor and the controller, and wherein a third bias resistor is coupled between the gate of the second bias transistor and the regulated supply voltage output; and a controller having an output port coupled to the gate of the first bias transistor and an input port coupled the regulated voltage supply output, the controller controlling the shunt transistor according to a state machine having a first state to close the shunt transistor when the regulated supply voltage reaches or exceeds a maximum hysteresis value and a second state to open the shunt transistor when the regulated supply voltage is equal to or less than a minimum hysteresis value, the controller periodically sampling the regulated voltage supply output and sending a control signal via the output port.

17. The voltage supply circuit of claim 16, further comprising a zener diode coupled between the regulated voltage supply output and ground, wherein the zener diode detects overcurrents from the direct current power source and activates the first and second bias transistors to turn the shunt transistor on.

* * * * *